Patented Sept. 24, 1935

2,015,381

UNITED STATES PATENT OFFICE

2,015,381

PROCESS OF PRODUCING LIGHT WEIGHT AGGREGATE AND THE PRODUCT THEREOF

Charles Knox Harding, deceased, late of Los Angeles, Calif., by Mabel T. Harding, San Diego, Calif., administratrix; said Charles Knox Harding, assignor, by mesne assignments, of one-half to William F. MacGlashan, Pasadena, Calif.

No Drawing. Continuation of applications Serial No. 375,585, July 2, 1929, and Serial No. 426,182, February 5, 1930. This application September 28, 1934, Serial No. 746,018. In Canada July 30, 1932

22 Claims. (Cl. 25—156)

This invention relates to an improved lightweight ceramic aggregate material for incorporation in hydraulic cement concrete or other building material and to the method of its manufacture. Also included within the scope of the invention is the concrete or building material in which the new material is used. More particularly the invention concerns the production, in gross quantities, of strong, light-weight, vesicular, ceramic bodies, most of which are of substantially the same size and shape.

Ordinary concrete, because it is composed largely of gravel and sand, is inherently heavy. For this reason stress calculations for concrete structures must take into account the weight of the concrete and the structures must usually be made much stronger than would otherwise be necessary to carry the weight of the concrete. The difficulty is not easily overcome by substituting other materials for concrete, because the strength and cheapness of concrete and the fact that it is fireproof and easily molded to the desired shape are advantages not easily found in a material of lighter weight that might be suggested for substitution.

Accordingly it is a purpose of the present invention to provide a new light weight concrete in which all of the advantages of gravel concrete are retained but in which the disadvantage of excessive weight is overcome. Also it is an object of this invention to produce a light weight concrete material that may be advantageously substituted for many building materials other than gravel concrete, such for example as brick, wood, plaster board and asbestos products.

Besides accomplishing these objects the present invention provides a substitute for the gravel in concrete, or an aggregate material for incorporation in other building materials, which is homogeneous, uniform, and strong, and makes the material that contains it a far better heat insulating material than ordinary building materials. Also, the bodies constituting the aggregate are symmetrical, usually spherical, and for that reason possess a maximum strength and a minimum of surface per unit of volume.

Furthermore, according to the invention herein described, a simple, expeditious, and economical method is provided for producing the new ceramic aggregate material from readily available raw materials, and with a minimum of equipment. By this method not only are gravel-size light weight bodies produced, but also a quantity of fines which can be used in place of sand in the subsequently formed concrete.

Broadly stated the new aggregate material is produced, in gross, by heating to the point of fusion quantities of preformed bodies comprised of clay or similar earthy material and constituents adapted to react to form a gas that will expand and vesiculate the bodies. To carry out the process on the bodies without separating each body from all the rest and yet without causing the bodies to coalesce or adhere together to form clinkers, it is necessary to fuse the interior of the bodies while maintaining the exteriors in a state in which they will not adhere to each other even though they are in contact. This may be done in several ways. The bodies may be covered or coated with a material less easily fusible than the bodies themselves; powdered or granular material less fusible than the bodies may be intermixed with them before they are fused so that the material will adhere to and cover the bodies as soon as their surfaces soften and become adherent; or the conditions of the kiln or furnace may be such as to form on the body a film or skin which is less easily fusible than the remainder of the body. Any one of these processes may be used or all three may be combined to make certain that the bodies will not form clinkers and that a firm shell will be formed around each of the bodies.

The basic raw material from which the bodies are formed can be almost any of the earthy materials that are generally used for the production of ceramic articles. Preferably, however, the starting material is an earth containing around one third alumina and two thirds silica which gives a molecular ratio of approximately $10SiO_2 : 3Al_2O_3$ which is about that usually found in soil and common clay. Red burning clays of this character, but containing 3 to 9% iron oxides, may be used.

The first consideration after selecting the raw material is its fusing or softening temperature. Should this be materially above 2000° F., lime, magnesia, iron compounds or material containing them or other fluxing substances may be added to cause the mixture to fuse or soften at around that temperature.

Also there is added, unless it happens to be already present in the material, 3 to 6% of a readily reducible compound or mixture of compounds that will liberate a gas or gases in the presence of carbon at temperatures around 2000° F. Among such materials are calcium sulphate, oxides of iron and mixtures of the two. As an example 2% of gypsum ($CaSO_4.6H_2$) may be added to an earth containing 3% iron oxide. Alternatively, fluxing materials may be used that will have the effect of reducing the softening temperature of the bodies and also will evolve a gas upon being heated under the proper conditions.

In addition to the substances already mentioned, 3 to 6% of carbonaceous material, such, for example, as coal or coke, is introduced into the mixture to cooperate with the substances mentioned above to expand and vesiculate the bodies when heated. The best results have been obtained by using 60–80 mesh coal or coke, introducing it into a part of the batch with enough water to form a thick slurry or very plastic mass, and then adding the balance of the batch and mixing the whole thoroughly. By using 60–80 mesh carbonaceous material and heating not too rapidly the bodies may be caused to expand smoothly and evenly without breaking or clinkering as they will if the gas formed is liberated suddenly inside the bodies. The gradual formation of gas may be aided by adding to the mix several compounds liberating gases at different temperatures. Magnesium and calcium sulphate are examples of such compounds. If for any reason it is desired that the aggregate be light colored, a white burning clay should be used in conjunction with colorless fluxing and gas producing materials, such for example, as gypsum.

After the mixture of ingredients has been made, the composition is pugged, extruded, and shaped into bodies of the desired size in a manner and by the use of equipment which is well known in the ceramic industries. Ordinarily, the material is molded into uniformly sized small balls or pellets of globular, rounded or at least rollable shape and of a relatively small size so that they will expand when heated to a size suitable for direct incorporation into concrete or whatever composition is to contain them. Any size bodies can be made from the size of the ordinary sand or fines used in concrete to a size even larger than the coarsest of aggregate materials in general use.

As an example of the expansion that takes place upon heating the bodies a test of a mixture containing only 3% of ferric oxide may be given. The material in the form of small pellets containing 60–80 mesh carbon granules was heated to 2000° F. in twenty minutes and maintained at that temperature for twelve minutes during which it expanded to over three times its original volume.

Having formed but not yet burned the ceramic bodies, consideration must be given to the prevention of clinkering or adherence between the bodies during the heating. Affecting this consideration are the characteristics desired for the final product. For example, if extreme lightness is not the main object, but strength is important, it is often advisable to coat the bodies before heating with a silicious material which aids in forming a solid, firm shell, or to heat the bodies in an oxidizing atmosphere which will burn out the carbon from the outer shell and prevent its vesiculating, thereby making the aggregate stronger but heavier.

If the aggregate is to be used in concrete the silicious chemically acid coating makes for a better bond to the basic calcareous Portland cement. On the other hand, a lighter weight aggregate may be made by adding a refractory material in powdered form to the aggregate before heating, but without coating the bodies and without the use of an oxidizing atmosphere during the heating.

Preferably, in forming a product for use in a hydraulic cement concrete where extreme lightness is not as important as strength and simplicity of manufacture, all three of the processes for preventing clinkering are combined and a very uniform product having strong rather thick shells, and with practically no units fused together is formed.

As an example of the first mentioned method of preventing adhesion between the bodies, namely the coating of the bodies with a refractory substance, formed rounded pieces of the fusible material, including the substances that will cause it to expand, may be coated on their outer surfaces with a refractory, relatively infusible, ceramic material such as a very fine silica, burned or raw fire clay rich in silica, or any other suitable inexpensive, ceramic, refractory material. A light diatomaceous earth consisting of silica in an allotropic reactive form makes an excellent coating for small bodies. The coating may be applied by being blown onto the pugs or bodies as they leave the extruding device and are cut apart. Some of the coating material, which is usually either in granular or powdered form, accompanies the bodies through the kiln. Preferably there is about 4 to 8% of the coating material with the aggregate when it is fired. After firing, the excess coating material is passed through a grating and is returned for reuse, while the coating material adhering to the pugs has become vitrified and welded into a practically continuous cover for the vesiculated bodies.

The firing may advantageously take place in a long rotating kiln into one end of which the aggregate is fed. The exhaust fuel gases leave through the same end, while the burned aggregate leaves and the unburned fuel gases enter at the opposite end. An air lock is used to discharge the burned product so that pressure may be maintained on the incoming gases. The kiln is adjusted so that the hottest part which is approximately 2000° F. is near the center and the burned gases in leaving preheat the incoming aggregate. This arrangement is important since it has been found to effect a substantial economy in fuel.

During its progress through the kiln the mass of aggregate is continually stirred and the time consumed by the passage through the kiln is regulated to produce the desired degree of vesiculation. On account of the number of variables involved this period of time is best fixed by experiment, but is usually around 20 minutes. One aggregate so treated expanded about 60% and was found well suited for use in reinforced concrete weighing somewhat over eighty-six pounds per cubic foot.

Ordinarily, the aggregate bodies made in the above manner have strong, waterproof shells and can be combined with less than enough cement to fill the voids between the bodies so as to form a porous, light weight concrete of great strength. With a larger proportion of cement a solid, non-porous, but heavier concrete results. A wall, the interior of which is of strong porous concrete and the exterior of which is of solid, non-porous concrete, often possesses the exact characteristics desired for building purposes. Such a wall can be made by placing in a mold alternate layers of the two kinds of concrete.

The second process, namely the addition of refractory material to the bodies of the kiln, may be illustrated by the introduction into the kiln, along with the bodies, of a quantity of powdered or granular refractory ceramic material, such for example as silica. During the burning the mass is constantly agitated or rolled by mechanical means so that the outside of the bodies will pick up the silica rapidly as they fuse and thus be prevented from welding together while at the same time acquiring a silicious shell that will later aid cement in bonding to the bodies. The shell, although very effective in preventing clinkering and in aiding the bonding with cement, is comparatively light and adds only about 4% to the weight of the large sizes of aggregate. Bodies made by this process are especially useful in making solid concrete by the use of at least enough cement to completely fill the voids between the bodies, as such concrete does not require aggregate bodies of any great strength because the strength is furnished by the cement matrix.

The process of the prevention of clinkering by the use of an oxidizing atmosphere during the heating of the bodies is chemically somewhat complex since it involves the oxidation of the compounds on the surface of the bodies and the resulting change in their fusing temperatures. The theory of the change is that ferric disilicate ($Fe_2O_3 \cdot 2SiO_2$) is formed by oxidation from ferrous silicate ($Fe_2Si_2O_6$) which is originally present in the bodies. The former compound having a higher fusing temperature forms a shell which does not fuse and hence preserves the identity and individuality of the bodies. Ferrous sulphide is also converted to the more refractory ferric oxide. Furthermore, the carbonaceous material in the outer shell of the body is burned out and removed before it can react with the other ingredients to form a gas and vesiculate the shell. Therefore, the shell is practically non-porous. Most of the shell forming reaction appears to take place in the range of temperature from around 1100° F. to about 1800 to 1900° F. The extent of this reaction and hence the thickness and weight of the shell can be governed by governing the length of time during which the shell remains in that temperature range and by governing the composition of the atmosphere to which the aggregate is submitted during the burning operation. If the atmosphere is only of an oxidizing nature during a short period the shell will be thin and light and vice versa. The temperature at which the oxidizing atmosphere is applied to the bodies also affects the characteristics of the shell and variation of these factors to produce a shell of any desired characteristics is within the scope of the present invention.

In preventing cohesion by the formation of an oxidized surface, the use of compounds causing expansion to take place gradually is of particular importance, as rapid expansion will so break the surface film that adhesion and clinkering are likely to result. As mentioned above, calcium and magnesium sulphates may be added in addition to the iron oxides.

Aggregate bodies made by any of the specific adaptations of the general process which is herein disclosed present many advantages. They are regular in size, homogeneous in composition and therefore equally strong in all directions and are economical to manufacture as the raw material, fuel and manufacturing costs are all low. In forming concrete, less fines and even less cement is required because of the spherical shape. The specific gravity of the bodies may be caused to be less than 1.3 if desired.

The foregoing description constitutes but a statement of the principles of this invention together with a few examples and it is contemplated that adaptations, alterations and modifications in the process and product will be made by those skilled in the art to meet the demands of particular situations. The aggregate bodies may be made in almost any size, they may be bound together by other materials than cement, coated with other refractory substances than those named or their compositions altered all within the scope of this invention.

This application is a continuation of applications 375,585, filed July 2, 1929, and 426,182, filed Feb. 5, 1930.

What is claimed is:

1. The process of producing light weight aggregate which comprises dividing a batch of expansible, fusible raw ceramic material into relatively small pieces, coating the exterior surfaces of said pieces with a refractory material and subjecting the coated pieces in bulk condition while in contact with other pieces to the action of hot gases until the temperature of the fusible and expansible bodies of individual pieces is raised to effect the fusing and expanding of the pieces while clinkering of the bulk is avoided by the refractory coatings.

2. The process of producing light weight aggregate from an expansible, fusible raw batch mixture consisting largely of argillaceous material which comprises dividing the mixture into relatively small pieces of generally rounded formation, coating the exterior surfaces of the pieces with a refractory relatively non-fusible material, subjecting the pieces in a loosely compacted bulk formation to the action of heated gases by causing the gases to pass through the bulk, effecting the continued heating of the pieces in bulk until the fusible portions thereof are softened and the pieces expanded, and thereafter permitting the pieces to cool with the result that they are in the form of light, vesicular, refractory coated bodies.

3. The method of producing a light vesicular ceramic aggregate which comprises forming uniformly sized independent bodies from a plastic raw ceramic batch of expansible, fusible and weldable plastic material, providing and maintaining an exterior heat conducting contacting surface on said units by coating the same with a more refractory relatively non-welding ceramic material, and subjecting a loose contacting mass of said units to sufficient heat above the incipient welding temperature of the interiors of said units to expand and render the units vesicular without otherwise expanding the more refractory material while maintaining the units independent and free from clinkering with each other.

4. The process of rendering ceramic material aggregate units vesicular without clinkering which comprises heating a contacting loose mass of independent units while maintaining a material more refractory than the ceramic material at the points of contact, continuing the heating of the units while maintaining the more refractory material between the contacting portions thereof until the units have become softened and expanded, whereby the units are rendered vesicular without clinkering.

5. Process of expanding and rendering vesiculose ceramic aggregate which comprises forming a plastic, fusible, expansible and weldable ceramic raw batch into approximately uniform sized individual units of generally rounded formation, providing the individual units with an outer surface of material more refractory and less easily welded than the interior thereof, heating the individual units while agitating the same in a bodily moving mass to render the same vitrified and vesicular while maintaining the units independent and freely movable with respect to the other units of the mass body.

6. The process of producing a light weight aggregate for concrete and the like comprising forming argillaceous material which is capable of being expanded by heat into a multiplicity of pellets, subjecting the pellets while in contact in bulk to the action of heat sufficient to effect a softening and expansion thereof, and maintaining the identity of the individual pellets and avoiding substantial clinkering thereof during the heating of the same by rendering the surfaces of the pellets substantially resistant to fusion at the temperatures utilized to effect the pellet expansion at a stage in the process prior to the fusion and expansion of the pellets.

7. The method of producing an improved, light, hollow, ceramic aggregate which comprises forming from a plastic raw ceramic batch of expansible, fusible and weldable, plastic material, approximately uniformly sized, solid unit bodies of substantially uniform, rounded rollable shape, of said weldable material and providing and maintaining an exterior heat conducting, non-vesiculatable contacting surface on said units of more refractory and non-welding ceramic material and subjecting a large loose, contacting mass of said units to sufficient heat above the incipient welding temperature of the bodies for sufficient time to expand and completely hollow the units without welding or clinkering together the fired ceramic units of the finished aggregate.

8. The process of expanding, and hollowing solid ceramic aggregate which comprises forming a plastic, fusible, expansible, weldable, ceramic raw batch into, approximately equal sized, solid individual units of substantially uniform rounded shape, rollability and heatability, providing and maintaining an outer contacting surface of more refractory, less easily welded, ceramic compounds on the outer contacting surfaces of said units, and firing a contacting, agitated, moving mass of said non-weldable aggregate, vitrifying and hollowing the units without welding or clinkering the finished aggregate units.

9. The process of producing partly hollow ceramic aggregate units from plastic material capable of being rendered vesicular which comprises forming the plastic material into units and rendering the surfaces thereof more refractory than the interior body portions, effecting the expansion of the units to render them vesicular by the application of heat to the units while maintained in a mass, and continuously subjecting the units to treatment for maintaining the refractory surfaces of the units intact during the expansion thereof.

10. The improved process of producing hollow ceramic structures which consists in forming unit structures of suitable size for use when expanded from plastic argillaceous, fusible, expansible material containing compounds capable of generating gases in the presence of carbon ions derived from a tangible mass of incandescent carbon capable of liberating carbon ions during considerable time, introducing a mass of incandescable carbon into the body of said structures of fusible material providing an exterior surface on said unit fusible structures surrounding the carbon of more refractory ceramic material which will be united with said fusible bodies but will not reach its welding temperature when the bodies of the units are heated to the high temperature necessary to soften, partly melt, and generate the gases which produce cells and bubbles within the fused body and expand the body and render it hollow and subjecting a contacting mass of said bodies and their surface layers to a temperature above the welding heat of the bodies and sufficient to fuse and expand the bodies of the units, generate gases therein and render them hollow but not sufficient to raise the refractory surface to its welding temperature and thereby rendering the units hollow without clinkering the unit structures of the contacting mass of aggregate.

11. The process of producing light weight aggregate in characteristically rounded vesticular generally globular particle form which comprises preparing a raw batch of clay material containing about 3% of ferric oxide and a substantial amount of ceramic fluxing material to effect the batch mixture to partially soften at temperatures of approximately 2000° F. with from 3 to 6% of granular carbonaceous material incorporated in a distributed condition into said batch, forming said mixtures into generally ball-like rollable pieces of a size materially smaller than the ultimate pieces to be produced, coating the fusible and expansible pieces thus formed with an exterior coating of refractory ceramic material which will not soften and permit clinkering of the same when a large mass of the coated pieces are in contact with each other and heated to the high temperature necessary to thoroughly soften and expand and render completely and uniformly vesicular the interior of the preformed pieces except the outer shell, and thereafter subjecting the individual rounded pieces while in bulk to the action of heat to fuse and expand and render the individual pieces vesicular without effecting a clinkering of the material in bulk.

12. The process of producing light weight aggregate in characteristically rounded vesicular generally globular particle form which comprises preparing a raw batch of clay material containing iron oxide and a ceramic fluxing material capable of softening the mixture at temperatures of approximately 2000° F. with from 3 to 6% of granular carbonaceous material incorporated in a distributed condition in said batch, forming said mixture into generally ball-like rollable pieces of a size materially smaller than the ultimate pieces to be produced, and thereafter subjecting the individual rounded pieces of aforesaid expansible material to the action of heat while in bulk at a temperature of approximately 2000° F. to effect the liberation of gases and cause the expansion of the softened material to a generally rounded light weight aggregate, the material being heated in bulk while being maintained against clinkering.

13. The process of producing a partly hollow silica coated ceramic concrete aggregate unit which consists in producing a refractory outer silicious surface or shell on the exterior surface of a relatively fusible body of ceramic material capable of being rendered vesicular and containing ferruginous compounds before it is vesiculated and expanded and then effecting the maintenance of the silicious refractory surface of the unit substantially intact while both its interior and exterior are being expanded and while portions of the more fusible interior material are being exposed at the surface of the unit.

14. The process of producing a hard strong solid waterproof outer surface on a vesiculated partly hollow ceramic aggregate unit which consists in forming an outer layer of refractory character on said body before it is fused and expanded and then maintaining said layer by the addition of granular refractory material brought into contact therewith during the time the surface of the body is being expanded during the vesiculating process.

15. The process of producing a partly hollow ceramic aggregate unit having a hard strong outer surface, which consists in producing a body of fusible, iron containing ceramic material capable of being rendered vesicular, providing the body with a refractory less fusible outer surface layer of heat conducting ceramic material, and then gradually vesiculating the body while maintaining and rebuilding the refractory outer surface layer.

16. The process of producing silica coated vesicular aggregate which consists in adding a silica coating layer to the outer surface of a vesiculatable ceramic body before it is expanded and then adding more refractory ceramic material to the surface during the expanding and vesiculating operation.

17. The process of vesiculating ceramic aggregate consisting of preformed pieces of plastic clay and iron compounds containing carbon, which consists in subjecting while being stirred, rolled and agitated a contacting mass of said loose pieces to gradually increasing temperature and causing them to gradually enlarge while surrounded by an oxidizing furnace atmosphere to assist in maintaining a refractory non-welding outer surface on said pieces by oxidizing the ferro-silicates and transforming the ferric compounds during the gradual vesiculating and expanding operation thereby maintaining intact a refractory and non-welding contacting exterior surface, and finishing the burning and expanding operation without clinkering.

18. An aggregate material, the individual units of which comprise artificially expanded, cellular, fired, ceramic material surrounded by an exterior surface of more dense material serving to strengthen the units and retard the entrance of moisture into the interior thereof.

19. An aggregate material, the individual units of which comprise artificially expanded, cellular, fired, ceramic material surrounded by an exterior surface of silicious material serving to strengthen the units and retard the entrance of moisture into the interior thereof.

20. An aggregate material, the individual units of which comprise artificially expanded, vesicular, fired, ceramic material surrounded by an exterior surface of more refractory material serving to strengthen the units and retard the entrance of moisture into the interior thereof.

21. An aggregate material, the individual units of which are characteristically of a generally globular shape and of such size as to make the material necessarily a bulk product, said units comprising artificially expanded, cellular, fired, ceramic material surrounded by an exterior surface of more dense material serving to strengthen the units and retard the entrance of moisture into the interior thereof.

22. An aggregate material, the individual units of which are characteristically of a generally globular shape and of such size as to make the material necessarily a bulk product, said units comprising artificially expanded, cellular, fired, ceramic material surrounded by an exterior surface of more dense material serving to strengthen the units and retard the entrance of moisture into the interior, said bodies having a specific gravity of less than 1.3.

MABEL T. HARDING,
*Administratrix of the Estate of Charles K. Harding, Deceased.*